United States Patent
Clifford et al.

(10) Patent No.: US 11,720,794 B2
(45) Date of Patent: Aug. 8, 2023

(54) TRAINING A MULTI-STAGE NETWORK TO RECONSTRUCT MR IMAGES

(71) Applicants: Siemens Healthcare GmbH, Erlangen (DE); The General Hospital Corporation, Boston, MA (US)

(72) Inventors: Bryan Clifford, Malden, MA (US); Thorsten Feiweier, Poxdorf (DE); Steffen Bollman, Gehofen (DE); Stephen Farman Cauley, Somerville, MA (US)

(73) Assignees: Siemens Healthcare GmbH, Erlangen (DE); The General Hospital Corporation, Boston, MA (US)

( * ) Notice: Subject to any disclaimer, the term of this patent is extended or adjusted under 35 U.S.C. 154(b) by 360 days.

(21) Appl. No.: 17/178,674

(22) Filed: Feb. 18, 2021

(65) Prior Publication Data

US 2022/0261629 A1 Aug. 18, 2022

(51) Int. Cl.
*G06N 3/08* (2023.01)
*G06N 3/045* (2023.01)
*G06T 11/00* (2006.01)

(52) U.S. Cl.
CPC .............. *G06N 3/08* (2013.01); *G06N 3/045* (2023.01); *G06T 11/003* (2013.01); *G06T 2210/41* (2013.01); *G06T 2211/424* (2013.01)

(58) Field of Classification Search
CPC ........ G06N 3/045; G06N 3/08; G06T 11/003; G06T 2210/41; G06T 2211/424;

(Continued)

(56) References Cited

U.S. PATENT DOCUMENTS

| 10,740,931 B2 * | 8/2020 | Cheng ................. G06N 3/088 |
| 2008/0080775 A1 * | 4/2008 | Zabih ...................... G06T 7/11 |
| | | 382/226 |

(Continued)

OTHER PUBLICATIONS

Florian Knoll et al., "Deep-Learning Methods for Parallel Magnetic Resonance Image Reconstruction", Jan. 15, 2020, IEEE Signal Processing Magazine, Computational MRI:Compressed Sensing and Beyond, pp. 128-137.*

(Continued)

*Primary Examiner* — Omar S Ismail

(57) ABSTRACT

A system and method include generation of modified imaging data and modified acquisition parameters of a training example based on the target imaging data and target acquisition parameters of each of a plurality of target examples, and generation, for each training example, of an initial reconstructed image based on the modified imaging data and modified acquisition parameters of the training example. A first network stage of a multi-stage network is trained based on the modified imaging data, modified acquisition parameters and initial reconstructed image of each training example, a first output image is generated for each training example by inputting the modified imaging data, modified acquisition parameters and initial reconstructed image of the training example to the trained first network stage, and a second network stage of the multi-stage network is trained based on the modified imaging data, modified acquisition parameters and first output image of each training example.

20 Claims, 12 Drawing Sheets

(58) Field of Classification Search
CPC .... G06T 1/00; G06T 3/00; G06T 5/00; G06T 7/00; G06T 19/00; G06T 17/00; G06T 2211/00; G06T 9/00
See application file for complete search history.

(56) References Cited

U.S. PATENT DOCUMENTS

| | | | | |
|---|---|---|---|---|
| 2018/0321347 | A1* | 11/2018 | Wang | G01R 33/5608 |
| 2019/0257905 | A1* | 8/2019 | Cheng | G01R 33/5608 |
| 2019/0325621 | A1* | 10/2019 | Wang | G06N 3/045 |
| 2020/0005497 | A1* | 1/2020 | Arberet | G06T 11/006 |
| 2020/0249300 | A1* | 8/2020 | Sandino | G06T 11/008 |
| 2021/0035338 | A1* | 2/2021 | Zhou | G06N 3/045 |
| 2021/0118200 | A1* | 4/2021 | Akcakaya | G06N 3/04 |
| 2021/0287780 | A1* | 9/2021 | Korani | G06N 3/08 |
| 2022/0261629 | A1* | 8/2022 | Clifford | G06T 11/003 |

OTHER PUBLICATIONS

Dana J. Lin, "Artificial Intelligence for MR Image Reconstruction: An Overview for Clinicians", Jan. 17, 2020, 2020 International Society for Magnetic Resonance in Medicine, vol. 53, No. 4, pp. 1019-1025.*

Guang Yang, "DAGAN: Deep De-Aliasing Generative Adversarial Networks for Fast Compressed Sensing MRI Reconstruction", Dec. 21, 2017, IEEE Transactions on Medical Imaging, vol. 37, No. 6, Jun. 2018, pp. 1310-1317.*

Dong Liang, "Deep Magnetic Resonance Image Reconstruction", Jan. 15, 2020, Computational MRI:Compressed Sensing and Beyond, IEEE Signal Processing Magazine, Jan. 2020, pp. 141-148.*

Kerstin Hammernik, "Learning a Variational Network for Reconstruction of Accelerated MRI Data", Nov. 8, 2017, Magnetic Resonance in Medicine 79:3055-3071 (2018), 2017 International Society for Magnetic Resonance in Medicine, pp. 3055-3065.*

Hemant K. Aggarwal, "MoDL: Model-Based Deep Learning Architecture for Inverse Problems", Aug. 13, 2018, IEEE Transactions on Medical Imaging, vol. 38, No. 2, Feb. 2019, pp. 394-402.*

Kerstin Hammernik, "-net: Systematic Evaluation of Iterative Deep Neural Networks for Fast Parallel MR Image Reconstruction", Dec. 18, 2019, arXiv:1912.09278v1, pp. 31-34.*

Alice Lucas, "Using Deep Neural Networks for Inverse Problems in Imaging", Jan. 9, 2018, Deep Learning for Visual Understanding:Part2, IEEE Signal Processing Magazine, Jan. 2018, pp. 21-32.*

Adler, Jonas et al., "Solving ill-posed inverse problems using iterative deep neural networks" May 22, 2017, Version 1.0, arXiv:1704.04058v2, [cs.cv], (pp. 1-24, 24 total pages).

Aggarwal, Hemant Kumar et al., "MoDL: Model Based Deep Learning Architecture for Inverse Problems", arXiv:1712.02862v1, [cs.CV], Dec. 7, 2017, (pp. 1-10, 10 total pages).

Arjovsky, Martin, et al., "Towards Principled Methods for Training Generative Adversarial Networks", Conference paper at ICLR 2017, (pp. 1-17, 17 total pages).

Hammernik, Kerstin et al., "Learning a Variational Network for Reconstruction of Accelerated MRI Data", Magnetic Resonance in Medicine, arXiv:1704.00447v1 [cs.CV], Apr. 3, 2017, 29 pgs.

Hammernik, Kerstin et al., "Σ-net: Systematic Evaluation of Iterative Deep Neural Networks for Fast Parallel MR Image Reconstruction", Magnetic Resonance in Medicine, arXiv:1912.09278v1 [eess.IV], Dec. 18, 2019, 38 pages.

Lin, Dana J. et al. "Artificial Intelligence for MR Image Reconstruction: An Overview for Clinicians", Journal of Magnetic Resonance Imaging 2020, (pp. 1-14, 14 total pages).

Zieba, Maciej "Multistage neural networks for pattern recognition", Master Thesis, Computer Science, Thesis No. MSE-2009:34, May 2009, 63pgs.

Pruessmann, Klass P. et al., "SENSE: Sensitivity Encoding for Fast MRI", Magnetic Resonance in Medicine, 42, (1999), (pp. 952-962, 11 total pages).

Shallue, Christopher J. et al., "Measuring the Effects of Data Parallelism on Neural Network Training", Journal of Machine Learning Research, 20, (2019), (pp. 1-49, 49 total pages).

Yang, Guang et al., "DAGAN: Deep De-Aliasing Generative Adversarial Networks for Fast Compressed Sensing MRI Reconstruction", IEEE Transactions on Medical Imaging, vol. XX, No. XX, Dec. 2017, (pp. 1-12, 12 total pages).

* cited by examiner

TRAINING A MULTI-STAGE NETWORK TO RECONSTRUCT MR IMAGES

BACKGROUND

Magnetic Resonance (MR) reconstruction refers to the transformation of data acquired by an MR scanner into viewable images. In this regard, an MR scanner does not acquire data directly in image space. Rather, an MR scanner transmits sequences of RF pulses into bodily tissue and receives RF signals therefrom. Field gradients are manipulated to create a spatially-varying phase across the received signals, which results in different superpositions of the signals. The signals are digitized to generate raw, or k-space, data, and each data point in k-space represents a different superposition of the received signals.

The inverse problem is designed to reconstruct an image from fully- or sparsely-sampled k-space data. The inverse problem typically takes the form of $$\rho = \operatorname*{argmax}_{\rho} D_\theta(\rho, d) + R(\rho),$$

where $\rho$ is the vector of image data, d is the vector of k-space data, $D_\theta(\rho, d)$ is a function which measures the level of data consistency (and is parameterized by the vector of parameters $\theta$ which describe the data collection process, such as k-space sampling pattern, $B_0$ field inhomogeneity, sequence type, and R(•) is a regularization functional used to incorporate a priori information. In most MR reconstruction methods $D_\theta(\rho, d)$ is represented as $\|d-E_\theta\rho\|_2^2$, where $E_\theta$ is a linear encoding operator which models the physical relationship between the MR image and k-space data.

Many approaches for solving the inverse problem currently exist, each of which presents different degrees of complexity and resulting image quality. Some approaches involve iterative algorithms. Each iteration of such an algorithm generates an updated version $\rho_{n+1}$ of the image such as:

$$\rho_{n+1} = U_{\omega_n}^n(\rho_n, d, \theta)$$

where $\rho_n$ is the image vector at the $n^{th}$ iteration, and $U_{\omega_n}^n(\bullet, \bullet, \bullet)$ represents an update function parameterized by the parameter vector $\omega_n$. The specific form of $U_{\omega_n}^n(\bullet,\bullet,\bullet)$ varies depending on the iterative algorithm.

An iterative reconstruction algorithm may be implemented using a multistage neural network. For example, the parameters in a multistage neural network are divided into different "stages", each of which may perform one iteration of the iterative algorithm. Conventional training methods attempt to learn the optimal network parameters and step sizes of each stage by minimizing the average of a given loss function over a set of training examples.

Conventional implementations of a multistage neural network to reconstruct MR images present potential problems. For example, the computation time for each parameter update during training may scale non-linearly with the number of parameters and therefore with the number of stages. Network performance (i.e., quality of the reconstructed image) tends to increase with the number of stages, however many additional training examples are needed in order to increase the number of stages without also increasing the risk of overfitting. Also, the entire network must be re-trained if the number of stages is changed. Moreover, conventional training does not easily facilitate the use of different loss functions for different stages of the network.

DETAILED DESCRIPTION

The following description is provided to enable any person in the art to make and use the described embodiments and sets forth the best mode contemplated for carrying out the described embodiments. Various modifications, however, will remain apparent to those in the art.

Generally, some embodiments operate to independently train the parameters of each stage of a multi-stage neural network for MR reconstruction. Briefly, a first stage is trained based on a plurality of first training examples, each of which consists of imaging data, acquisition parameters, an initial image determined based on the imaging data and acquisition parameters, and a ground truth image. The trained first stage is used to generate an output image based on the imaging data, acquisition parameters and initial image of each training example. A second stage is then trained based on a plurality of training examples identical to the first training examples except the initial image of each training example is replaced with the corresponding output image generated by the first stage. Training may continue in this manner until the performance of a network composed of all the trained stages is satisfactory and/or until a predetermined number of stages has been trained. Embodiments may therefore require less training data and less computational time than conventional systems.

In some embodiments, one or more of the trained stages may be re-trained based on the output of the overall network while the other stages of the network remain static. Moreover, the training described herein allows the use of different loss functions and/or methods for optimizing the loss function for each stage.

Figure 1A:
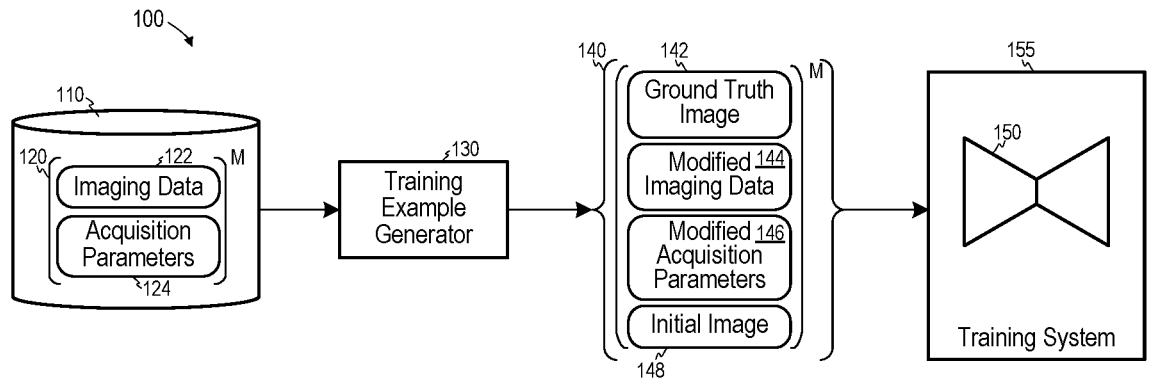
FIG. 1A is a block diagram illustrating training of a first stage of a multi-stage network to reconstruct MR images according to some embodiments.

FIG. 1A is a block diagram illustrating training of a first stage of a multi-stage network to reconstruct MR images according to some embodiments. Each component of system 100 may be implemented using any suitable combination of hardware and/or software, and elements of two or more components may be implemented by a same combination of hardware and/or software.

Storage system 110 may comprise any system for storing data, including volatile, non-volatile, distributed, remote, and local storage systems. In some embodiments, storage system 110 is a fixed disk of a computing system which executes some or all of the steps described herein with respect to FIGS. 1A through 1C.

Storage system 110 includes m ground truth examples 120. Each of the m ground truth examples includes imaging data 122 and acquisition parameters 124 which describe the acquisition of the imaging data 122 of the example. Acquisition parameters 124 may comprise parameters which may be used by a reconstruction algorithm to reconstruct an image based on imaging data 122.

In the description below, it will be assumed that m ground truth examples 120 include sufficiently-sampled k-space imaging data 122 acquired by an MR scanner under favorable imaging conditions. Associated acquisition parameters 124 may include coil sensitivity maps, k-space sampling pattern, and other parameters including but not limited to $B_0$ field inhomogeneity, sequence type (e.g., TR/TE/TI), gradient timings, and RF pulse parameters.

The systems described herein may be applied to iterative reconstruction based on other types of imaging data acquired using other imaging modalities. For example, imaging data 122 may comprise data acquired via Computed Tomography (CT), Positron-emission Tomography (PET), Single-photon Emission Computed Tomography (SPECT) or ultrasound modalities. Of course, the type of acquisition parameters 124 within a ground truth example are dependent upon the imaging modality used to acquire imaging data 122 of the example.

Training example generator 130 may comprise any one or more hardware and/or software components to generate training examples 140 based on ground truth examples 120. Training example generator 130 may generate one or more training examples 140 based on each ground truth example 120. However, for simplicity, FIG. 1A illustrates generation of one training example 140 for each of the m ground truth examples 120.

Each training example 140 generated based on a ground truth example 120 includes a ground truth image 142, modified imaging data 144, modified acquisition parameters 146 and an initial image 148. Training example generator 130 reconstructs the ground truth image 142 from the imaging data 122 of the ground truth example 120 based on the acquisition parameters 124 and a reconstruction algorithm. The reconstruction algorithm is intended to generate a high-quality and substantially artifact-free image based on the ground truth example 120. The reconstruction algorithm used by training example generator 130 may comprise an inverse discrete Fourier transform reconstruction, for example.

In some embodiments, the ground truth example 120 includes an already-generated ground truth image corresponding to the imaging data 122 and acquisition parameters 124 of the ground truth example 120, in which case training example generator 130 may simply copy the ground truth image 142 from the ground truth example 120.

Training example generator 130 may modify either or both of imaging data 122 and acquisition parameters 124 of a ground truth example 120 to generate modified imaging data 144 and modified acquisition parameters 146 of a corresponding training example 140. Imaging data 122 and/or acquisition parameters 124 may be modified to simulate errors (e.g., patient motion) and/or other potential issues (e.g., undersampling of k-space) in the acquisition of imaging data 122. Examples of this modification according to some embodiments will be provided below.

Training example generator 130 generates an initial image 148 of a training example 140 based on modified imaging data 144 and modified acquisition parameters 146 of the training example 140. The initial image 148 may be generated based on a SENSE reconstruction algorithm, a GRAPPA reconstruction algorithm, or any other suitable reconstruction algorithm. According to some embodiments, the reconstruction algorithm used to generate the initial image 148 is relatively fast and not resource-intensive.

Network stage 150 is trained to generate an image based on m training examples 140. Network stage 150 may comprise any type of learning network that is or becomes known. Broadly, network stage 150 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified via training as will be described below. Network 150 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Training system 155 may operate as is known in the art to input the modified imaging data 144, modified acquisition parameters 146 and initial image 148 of a training example 140 to network stage 150, receive an output image from network stage 150, determine a loss based on a comparison of the output image to the ground truth image 142 and possibly the modified imaging data 144 of the training example 140, and repeat the process for each training example 140. The total loss is back-propagated to network 150 in order to modify parameters network stage 150 in an attempt to minimize the total loss. Network stage 150 is iteratively modified in this manner until the total loss reaches acceptable levels or training otherwise terminates (e.g., due to time constraints or to the loss asymptotically approaching a lower bound). At this point the parameters of network stage 150 are considered trained.

According to some embodiments, the performance of trained network stage 150 is evaluated based on testing examples. Testing examples may be generated from a separate set of ground truth examples as described above with respect to generation of training examples 140. Evaluation may include inputting the modified imaging data, modified acquisition parameters and initial image of each testing example to trained network stage 150, receiving output images, and comparing the output images to respective ones of the ground truth images of the testing examples. Comparison of the images may be performed using any metric (e.g., squared error, absolute error, structural similarity index measure, or a quality score obtained from radiological evaluations).

Figure 1B:
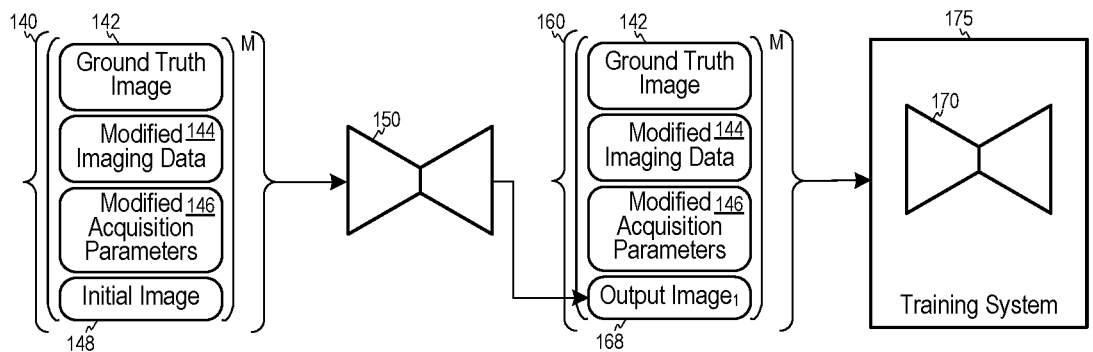
FIG. 1B is a block diagram illustrating training of a second stage of a multi-stage network to reconstruct MR images according to some embodiments.

FIG. 1B is a block diagram illustrating training of a second stage of the multi-stage network according to some embodiments. Training examples 140 remain as they were described with respect to FIG. 1A. Training examples 140 are input to trained network stage 150 to generate a first stage output image (output image$_1$) 168 for each training example 140. Each initial image 148 of each training example 140 is replaced by the output image$_1$ 168 generated based on the training example to generate second training examples 160 as shown in FIG. 1B.

Network stage 170 is trained to generate an image based on m training examples 160. In particular, training system 175 may input the modified imaging data 144, modified acquisition parameters 146 and output image$_1$ 168 of each training example 160 to network stage 170 and determine a total loss based on the resulting output image and the ground truth images 142 of the training examples 160. Network stage 170 is iteratively modified based on successive determinations of total loss until training is deemed complete. The loss function optimized during training of network stage 170 as well the optimization method may differ from those used in the training of network stage 150.

Performance of the overall network trained thus far may then be evaluated, for example, to determine whether any additional network stages are needed. For example, the testing examples described above are input into trained first network stage 150 and the output thereof is input to trained second network stage 170 along with the modified imaging data and the modified acquisition parameters of the testing examples. The output of the trained second network stage 170 is then compared with the ground truth images of the testing examples to determine whether performance of the overall network consisting of trained network stage 150 and trained network stage 170 is satisfactory.

Figure 1C:
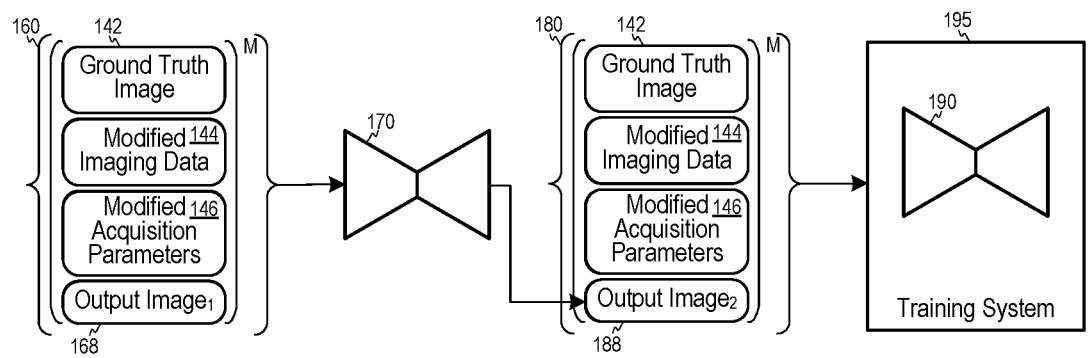
FIG. 1C is a block diagram illustrating training of a third stage of a multi-stage network to reconstruct MR images according to some embodiments.

If, as illustrated in FIG. 1C, another network stage is desired (i.e., either because the performance of the current network of trained network stages is unsatisfactory, or because a certain number of network stages (e.g., >2) is desired regardless of the performance of a network consisting of fewer network stages, or another reason), training examples 160 are input to trained network stage 170 to generate a second stage output image (output image$_2$) 188 for each training example 140. Third network stage 190 is trained as described above based on m training examples 180, each of which consists of a ground truth image 142, modified imaging data 144, modified acquisition parameters 146 and output image$_2$ 188. The performance of the trained third network stage 190, as well as the performance of the overall multi-stage network, may then be evaluated using testing examples as described above.

Figure 2:
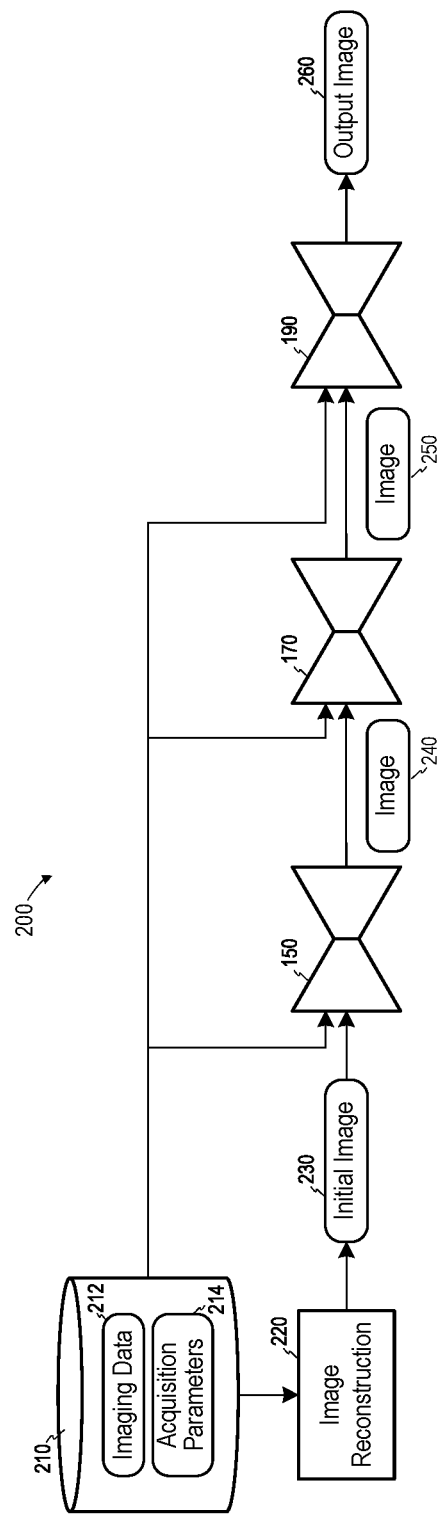
FIG. 2 is a block diagram illustrating reconstruction of an MR image from MR imaging data using a trained multi-stage network according to some embodiments.

FIG. 2 illustrates system 200 deploying trained network stages 150, 170 and 190 to reconstruct images based on imaging data and acquisition parameters according to some embodiments.

Storage device 210 includes imaging data 212 acquired by an MR scanner and acquisition parameters 214 describing the acquisition. Image reconstruction component 220 uses imaging data 212 and acquisition parameters 214 to generate initial image 230. The reconstruction algorithm of image reconstruction component 220 might not require acquisitions parameters 214 and may generate initial image 230 based solely on imaging data 212. Image reconstruction component 220 uses the same reconstruction algorithm which was used to generate the initial images of the training examples which were used to train network stage 150.

Initial image 230, imaging data 212 and acquisition parameters 214 are input to trained network stage 150, which generates image 240. Similarly, image 240, imaging data 212 and acquisition parameters 214 are input to trained network stage 170, which generates image 250. Finally, image 250, imaging data 212 and acquisition parameters 214 are input to trained network stage 170, which generates output image 260.

Figure 3:
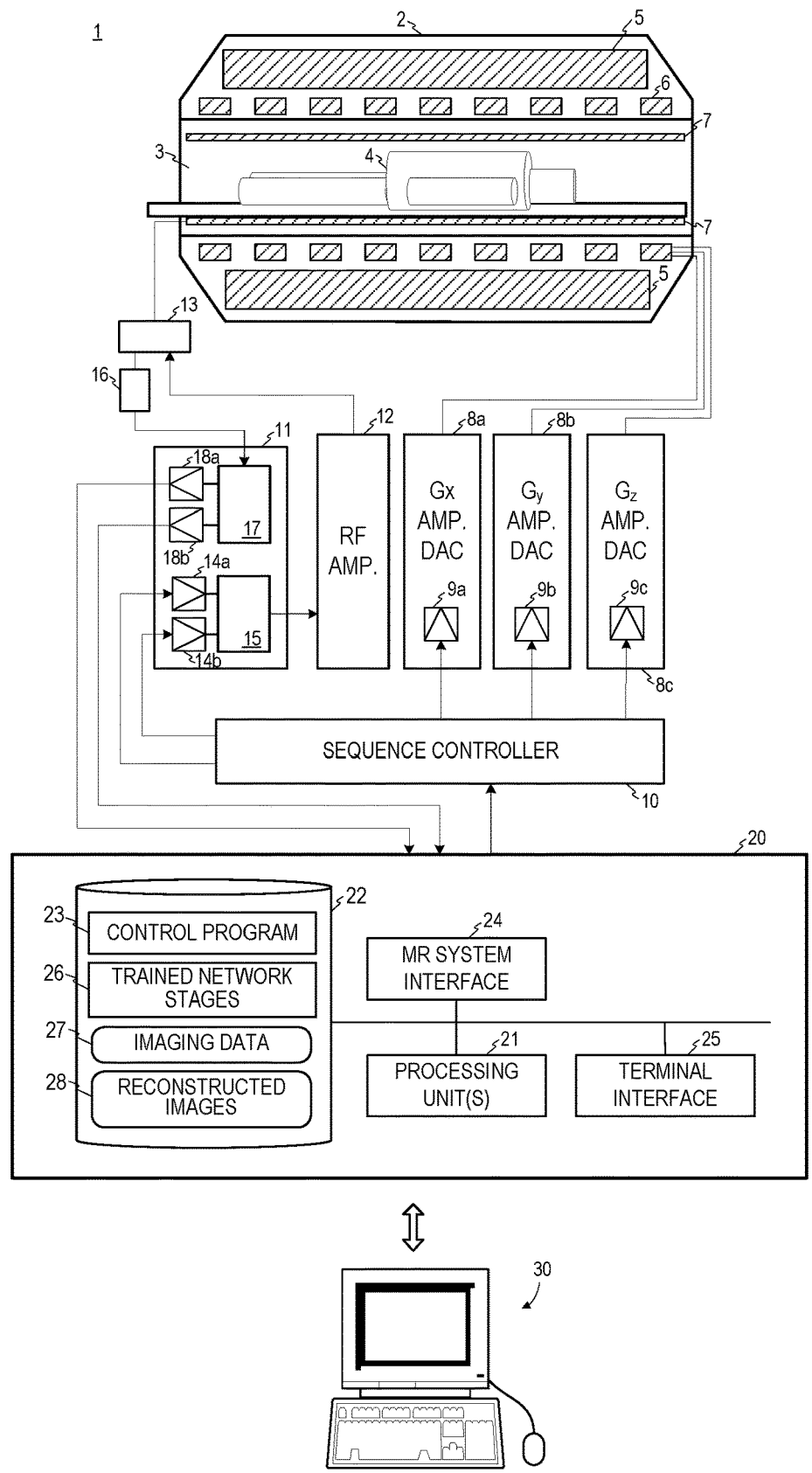
FIG. 3 illustrates an MR imaging system to acquire MR imaging data and to reconstruct MR images from MR imaging data utilizing a trained multi-stage network according to some embodiments.

FIG. 3 illustrates MR system 1 for acquiring imaging data and generated images based thereon according to some embodiments. MR system 1 may therefore comprise an implementation of system 200 of FIG. 2. Embodiments are not limited to MR system 1.

MR system 1 includes MR chassis 2, which defines bore 3 in which patient 4 is disposed. MR chassis 2 includes polarizing main magnet 5, gradient coils 6 and RF coil 7 arranged about bore 3. According to some embodiments, polarizing main magnet 5 generates a uniform main magnetic field ($B_0$) and RF coil 7 emits an excitation field ($B_1$).

According to MR techniques, volume of material 4 (e.g., human tissue) is subjected to a main polarizing magnetic field (i.e., $B_0$), causing the individual magnetic moments of the nuclear spins in the material to process about the polarizing field in random order at their characteristic Larmor frequency, in an attempt to align with the field. A net magnetic moment $M_z$ is produced in the direction of the polarizing field, and the randomly oriented magnetic components in the perpendicular plane (the x-y plane) cancel out one another.

The material is then subjected to an excitation field (i.e., $B_1$) created by emission of a radiofrequency (RF) pulse, which is in the x-y plane and near the Larmor frequency, causing the net aligned magnetic moment $M_z$ to rotate into the x-y plane so as to produce a net transverse magnetic moment $M_t$, which is rotating, or spinning, in the x-y plane at the Larmor frequency. The excitation field is terminated, and signals are emitted by the excited spins as they return to their pre-excitation field state.

Gradient coils 6 produce magnetic field gradients $G_x$, $G_y$, and $G_z$ which are used for position-encoding NMR signals. The magnetic field gradients $G_x$, $G_y$, and $G_z$ distort the main magnetic field in a predictable way so that the Larmor frequency of nuclei within the main magnetic field varies as a function of position. Accordingly, an excitation field $B_1$ which is near a particular Larmor frequency will tip the net aligned moment $M_z$ of those nuclei located at field positions which correspond to the particular Larmor frequency, and signals will be emitted only by those nuclei after the excitation field $B_1$ is terminated.

Gradient coils 6 may consist of three windings, for example, each of which is supplied with current by an amplifier 8a-8c in order to generate a linear gradient field in its respective Cartesian direction (i.e., x, y, or z). Each amplifier 8a-8c includes a digital-analog converter 9a-9c which is controlled by a sequence controller 10 to generate desired gradient pulses at proper times.

Sequence controller 10 also controls the generation of RF pulses by RF system 11 and RF power amplifier 12. RF system 11 and RF power amplifier 12 are responsive to a scan prescription and direction from sequence controller 10 to produce RF pulses of the desired frequency, phase, and pulse amplitude waveform. The generated RF pulses may be applied to the whole of RF coil 7 or to one or more local coils or coil arrays. RF coil 7 converts the RF pulses emitted by RF power amplifier 12, via multiplexer 13, into a magnetic alternating field in order to excite the nuclei and align the nuclear spins of the object to be examined or the region of the object to be examined. RF pulses may be emitted in a magnetization preparation step in order to enhance or suppress certain signals.

The RF pulses are represented digitally as complex numbers. Sequence controller 10 supplies these numbers in real and imaginary parts to digital-analog converters 14a-14b in RF system 11 to create corresponding analog pulse sequences. Transmission channel 15 modulates the pulse sequences with a radio-frequency carrier signal having a base frequency corresponding to the resonance frequency of the nuclear spins in the volume to be imaged.

RF coil 7 both emits radio-frequency pulses as described above and scans the alternating field which is produced as a result of processing nuclear spins, i.e. the nuclear spin echo signals. The received signals are received by multiplexer 13, amplified by RF amplifier 16 and demodulated in receiving channel 17 of RF system 11 in a phase-sensitive manner. Analog-digital converters 18a and 18b convert the demodulated signals into real and imaginary components.

System 20 may comprise any general-purpose or dedicated computing system. Accordingly, system 20 includes one or more processing units 21 (e.g., processors, processor cores, execution threads, etc.) configured to execute processor-executable program code to cause system 20 to operate as described herein, and storage device 22 for storing the program code. Storage device 22 may comprise one or more fixed disks, solid-state random-access memory, and/or removable media (e.g., a thumb drive) mounted in a corresponding interface (e.g., a USB port).

Storage device 22 stores program code of control program 23. One or more processing units 21 may execute control program 23 to provide instructions to sequence controller 10 via MR system interface 24. For example, sequence controller 10 may be instructed to initiate a desired pulse sequence. Sequence controller 10 may be instructed to control the switching of magnetic field gradients via amplifiers 8a-8c at appropriate times, the transmission of radio-frequency pulses having a specified phase and amplitude at specified times via RF system 11 and RF amplifier 12, and the readout of the resulting MR signals.

Computing system 20 receives the real and imaginary components of the emitted MR signals from analog-digital converters 18a and 18b and stores the emitted MR signals as k-space imaging data 27. Control program 23 may also be executed to input imaging data to trained network stages 26 as described above with respect to FIG. 2, including the generation of an initial image, to generate reconstructed images 28.

Trained network stages 26 may comprise, for each network stage represented therein, a function which represents the operations applied to the inputs of the network stages due to the values of the trained parameters of the trained network stage. In order to implement a multi-stage network such as shown in FIG. 2, the function of first trained network stage 150 is applied to appropriate input data, followed by application of the function of second trained network stage 170 to appropriate input data (which includes the output of the first function), and application of the function of third trained network stage 190 to appropriate input data (which includes the output of the second function). Additional trained network stages may be deployed in a similar manner.

Reconstructed images 28 may be provided to terminal 30 via terminal interface 25 of system 20. Terminal interface 25 may also receive input from terminal 30, which may be used to provide commands to control program 23 in order to control sequence controller 10 and/or other elements of system 1. The commands may include commands to initiate an imaging sequence to acquire imaging data of a subject. Terminal 30 may simply comprise a display device and an input device coupled to system 20. In some embodiments, terminal 30 is a separate computing device such as, but not limited to, a desktop computer, a laptop computer, a tablet computer, and a smartphone.

Each element of system 1 may include other elements which are necessary for the operation thereof, as well as additional elements for providing functions other than those described herein. Storage device 22 may also store data and other program code for providing additional functionality and/or which are necessary for operation of system 20, such as device drivers, operating system files, etc.

Figure 4:
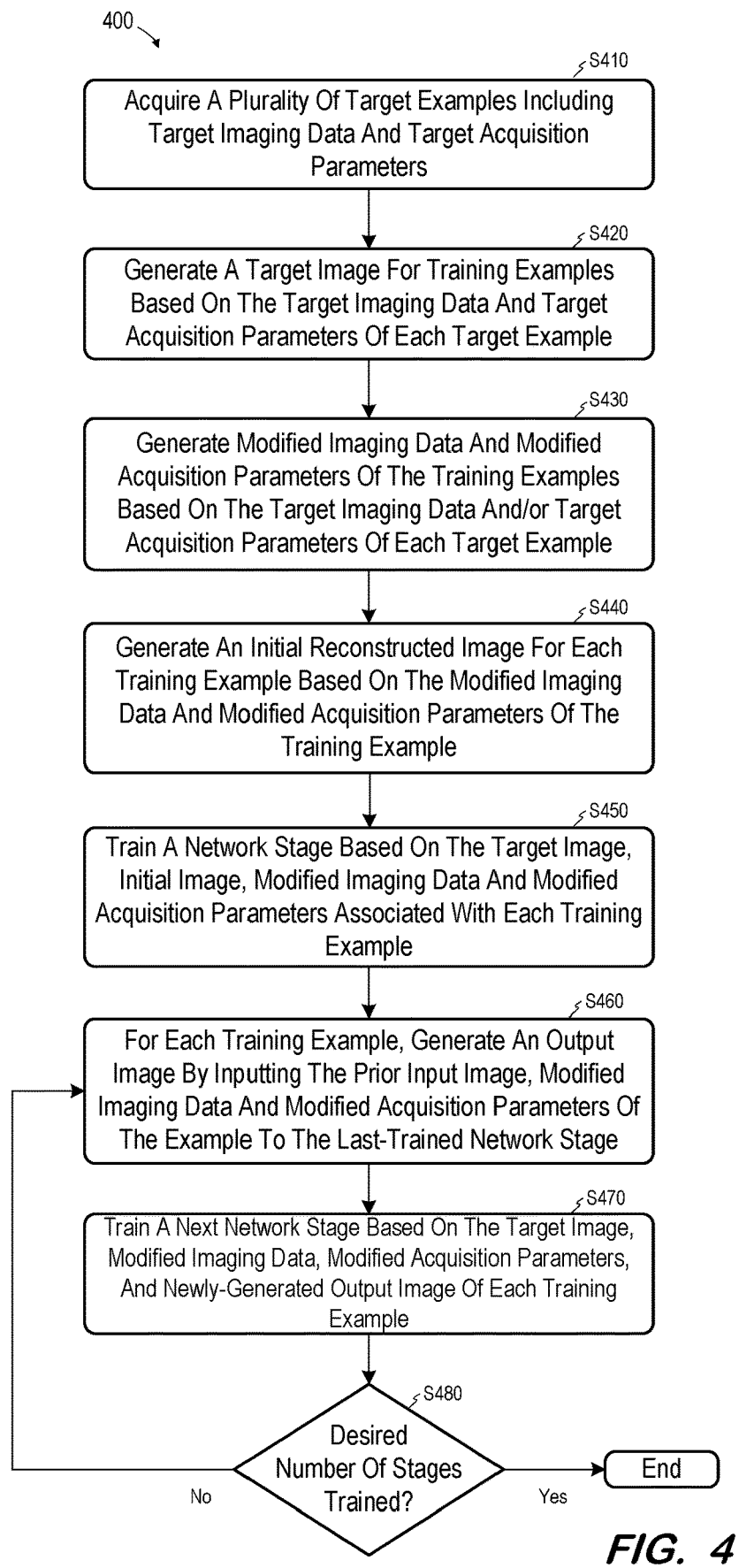
FIG. 4 is a flow diagram of a process to train a multi-stage network to reconstruct MR images according to some embodiments.

FIG. 4 is a flow diagram of process 400 to train a multi-stage network to reconstruct MR images according to some embodiments. Process 400 and the other processes described herein may be performed using any suitable combination of hardware and processor-executable program code, i.e., software. Program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a processing thread. Embodiments are not limited to the examples described below.

Process 400 may be performed by more than one computing system. For example, network stage training and/or evaluation steps of process 400 may be performed by a remote (e.g., cloud-based) system.

Initially, at S410, a plurality of target examples including target imaging data and associated target acquisition parameters are acquired. As described above, the target imaging data of each target example may include sufficiently-sampled k-space imaging data acquired by an MR scanner under favorable imaging conditions. The target acquisition parameters associated with the target imaging data of an example may include coil sensitivity maps, k-space sampling pattern, and other parameters.

In some embodiments, the plurality of target examples represent a range of subjects and imaging data acquisition under a wide range of experimental conditions (e.g., different image orientations, different MR receiver coils arrays, $B_0$ field inhomogeneities, different MR scanners). The subjects may include healthy subjects and subjects exhibiting various pathologies. Since many target examples are desired, the plurality of target examples may be obtained from many disparate sources (e.g., multiple imaging centers). Some target examples (i.e., imaging data and associated acquisition parameters) may be generated from simulations which mimic the effect of realistic experimental conditions and provide variability in the physiology of simulated subjects.

At S420, a target image for a training example is generated based on the target imaging data and target acquisition parameters of each target example. According to some embodiments and as described with respect to FIG. 1A, the target image may be reconstructed using a reconstruction algorithm intended to generate a high-quality and substantially artifact-free image. A suitable target image may be acquired along with some or all of the plurality of target examples at S410, so that the target images for corresponding training examples need not be generated at S420.

Modified imaging data and modified acquisition parameters are generated for each training example at S430, based on the target imaging data and target acquisition parameters of the corresponding target example. Even though S430 describes "modified" imaging data and acquisition parameters, it should be noted that either one or both of the modified imaging data and modified acquisition parameters of a training example may be identical to the imaging data or acquisition parameters of the corresponding target example.

Modified imaging data and modified acquisition parameters may be generated to simulate expected imaging scenarios. For example, in order to assist training of a multi-stage network to reconstruct a satisfactory image from undersampled k-space, the target acquisition parameters of a target example may be modified to represent a vector of k-space sampling locations for undersampled data concatenated with a vector of coil sensitivity maps. The target imaging data may also be modified by applying an undersampling operation thereto based on the modified acquisition parameters.

Example modifications to the imaging data include the addition of noise and the addition of motion. The acquisition parameters may be modified, for example, to include field inhomogeneity, reduce the resolution of the sensitivity maps, add noise to the sensitivity maps, or add indications of subject motion.

An initial image is reconstructed at 440 for each training example based on the modified imaging data and the modified acquisition parameters of each training example. The initial image may be generated using any suitable reconstruction algorithm. Generally, use of a reconstruction algorithm which provides a better-quality initial image will increase overall network performance and/or decrease the number of stages required to achieve desired performance. However, such an algorithm may require increased training time and computing resources.

At this point of process 400, a plurality of training examples are available for training an initial network stage. Each of the plurality of training examples includes a target image (generated at S420), modified imaging data and modified acquisition parameters (generated at S430), and an initial image (generated at S440).

Figure 5:
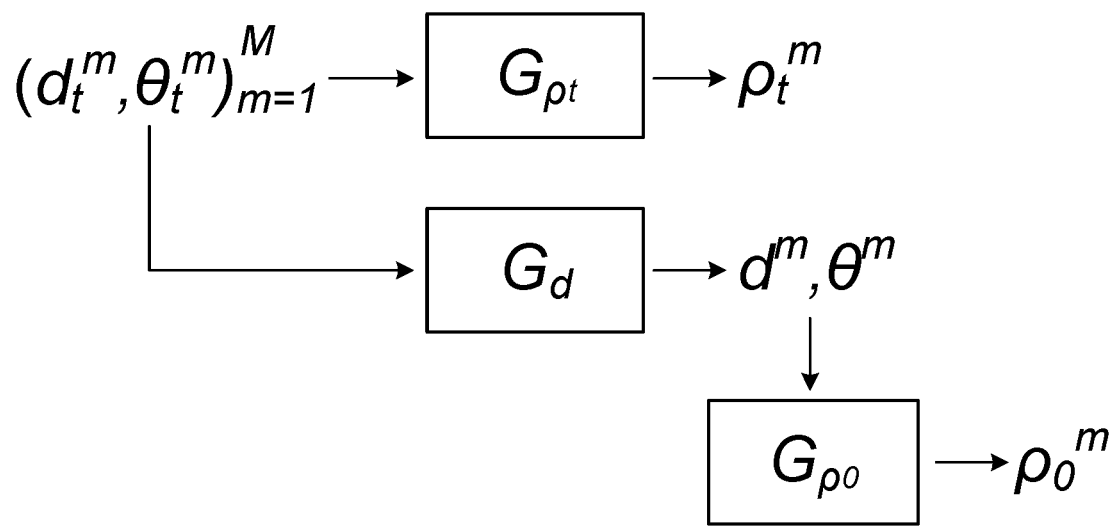
FIG. 5 illustrates generation of training data according to some embodiments.

FIG. 5 illustrates generation of a target image, modified imaging data and modified acquisition parameters, and an initial image for each of M training examples according to some embodiments. As shown, $\rho_t^m$, $\rho_0^m$, $d^m$, $\theta^m$ represent the target image, initial image, imaging data and acquisition parameters of the $m^{th}$ training example, respectively. Each target image $\rho_t^m$ is generated from its corresponding target example $(d_t^m, \theta_t^m)$ via function/algorithm $G_{\rho_t}$, and each set of modified imaging data and modified acquisition parameters $(d^m, \theta^m)$ is generated from its corresponding target example $(d_t^m, \theta_t^m)$ via function/algorithm $G_d$. Also, each initial image $\rho_0^m$ is generated from the modified imaging data and modified acquisition parameters $(d^m, \theta^m)$ of its training example, imaging data and acquisition parameters from its corresponding vector of target data via function/algorithm $G_{\rho_0}$. The forms of functions/algorithms $G_{\rho_t}$, $G_d$ and $G_{\rho_0}$ can vary based on, for example, application, acquisition, types of loss functions, and network design.

In the present example, each target image generated at S420 corresponds to a single training example which is generated based on the target example. Embodiments are not limited to this one-to-one correspondence. Rather, a plurality of training examples may be generated based on any of the target examples. For example, two different sets of modified imaging data and modified acquisition parameters may be generated from a single target example, resulting in two initial images. Therefore, the single target example results in a first training example including a target image, the first set of modified imaging data and modified acquisition parameters, and an initial image generated based on the first set of modified imaging data and modified acquisition parameters, and a second training example including the same target image, the second set of modified imaging data and modified acquisition parameters, and an initial image generated based on the second set of modified imaging data and modified acquisition parameters.

In another example, a single target example results in a first training example including a target image, modified imaging data and modified acquisition parameters, and an initial image generated based on the modified imaging data and modified acquisition parameters using a first reconstruction algorithm, and a second training example including the same target image, the same modified imaging data and modified acquisition parameters, and an initial image generated based on the modified imaging data and modified acquisition parameters using a second reconstruction algorithm.

Figure 6:
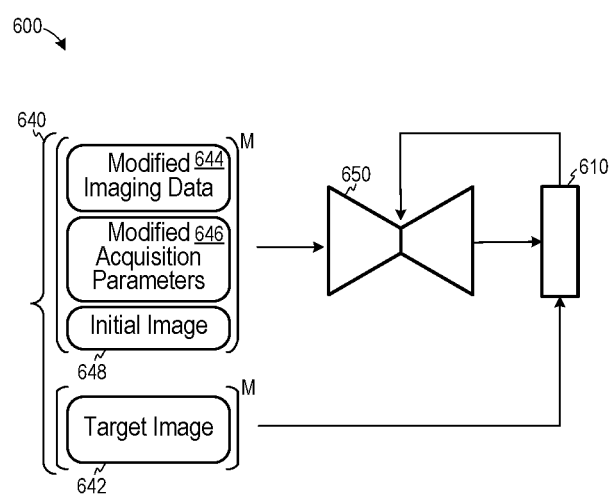
FIG. 6 is a block diagram of a system for training a network stage based on training data according to some embodiments.

A network stage is trained at S450 based on the generated training examples. As illustrated in FIG. 6, training may generally consist of inputting the modified imaging data 644, the modified acquisition parameters 646, and the initial image 648 of each training example 640 to network stage 650. Loss layer 610 compares the resulting output to the target image 642 of each training example 640 to determine a total loss. The loss associated with each training example may be determined as the sum of absolute differences of each pixel in the target image and output image, the average pixel error, or any other metric or combination of metrics. Network stage 650 is modified based on the total loss and the process repeats until a satisfactory total loss is achieved (or training aborts). Embodiments may implement any suitable function for determining the loss and any suitable algorithm for modifying the network stage to optimize the loss function.

With $\omega_0$ representing the parameters of the first (n=0) network stage, training the first network stage at S450 may consist of learning the optimal network parameters $\omega_0$ to minimize the average of a loss metric over the set of training examples m, i.e., $$\omega_0 = \underset{\omega}{\mathrm{argmin}} \frac{1}{M} \sum_{m=1}^{M} L_0(\rho_t^m, U_\omega^0(\rho_0^m, d^m, \theta^m), d^m, \theta^m)$$

where $L_0(\bullet, \bullet, d^m, \theta^m)$ is the loss function used to train the first stage. The data $d^m$ and parameters $\theta^m$ are included in the loss function since they may also be included in the computation of the loss. For example, in a case that loss consists of a weighted combination of absolute error, structural similarity index measure, and data consistency, the data consistency component of the loss depends on the data and parameters.

Figure 7:
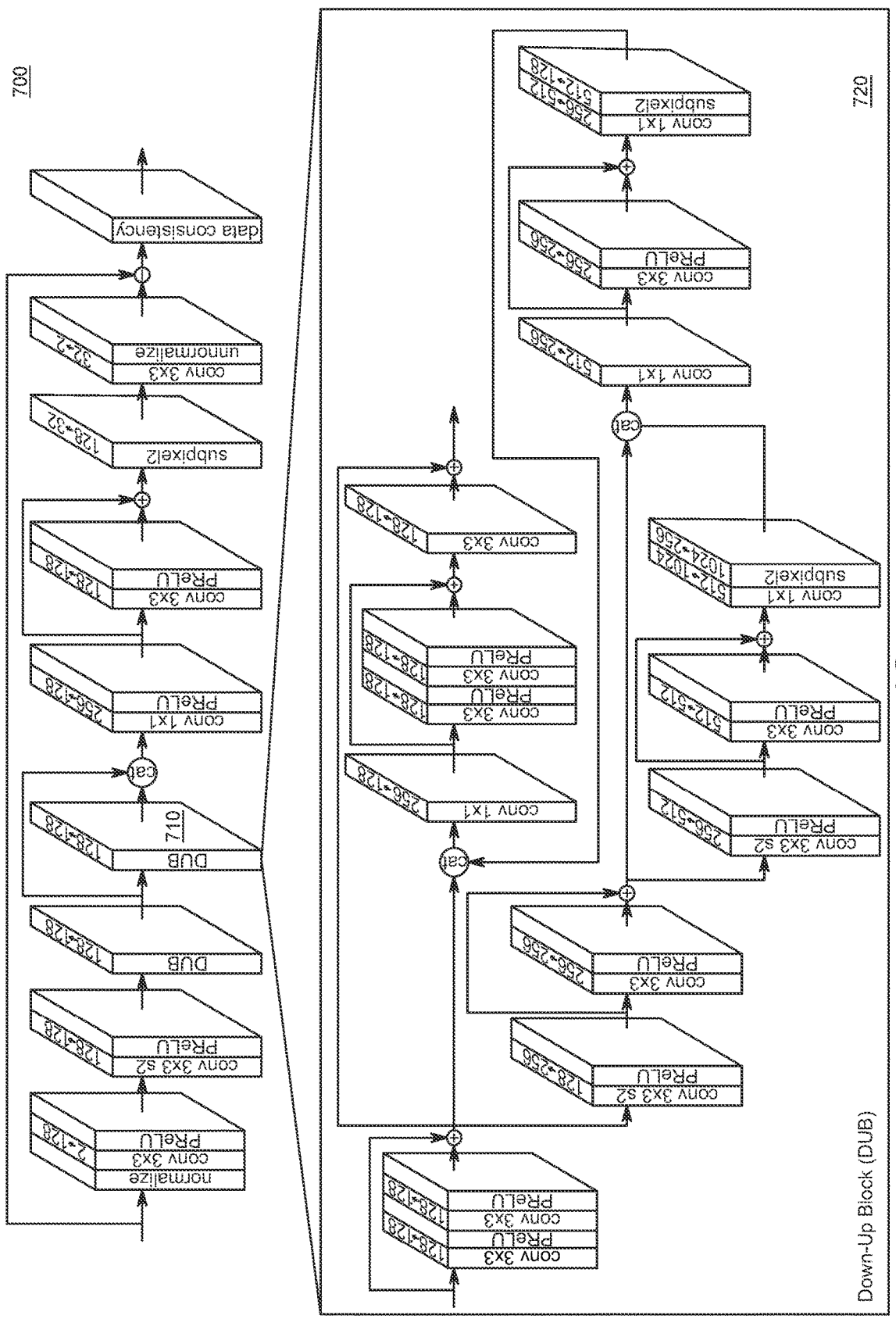
FIG. 7 illustrates a neural network architecture according to some embodiments.

FIG. 7 illustrates an architecture of a network stage to perform an iteration of a reconstruction algorithm according to some embodiments. Architecture 700 comprises a Down-Up network as is known in the art, and shows detailed representation 720 of a Down-Up block 710 used in the architecture according to some embodiments. Down-Up block 710 is concatenated and consists of numerous residual blocks at various scales. Down-Up block 710 is repeated in an iterative manner and parameters over the iterations can be shared or variable. Any other network stage architectures may be used, including but not limited to a U-net architecture. Moreover, one or more network stages of a multi-stage network as described herein may conform to architectures different from the architecture of another one or more network stages of the multi-stage network.

At S460, and for each training example, an output image is generated by inputting the modified imaging data, the modified acquisition parameters, and the prior input image (in this case, the "initial" image) of the training example to the previously-trained stage. A next network stage is then trained at S470 based on the target image, modified imaging data, modified acquisition parameters, and newly-generated output image of each training example. More specifically, S470 may consist of inputting the modified imaging data, the modified acquisition parameters, and the prior-stage output image of each training example to the next network stage and iteratively modifying the next network stage based on differences between the resulting output images and the target images of corresponding training examples.

At S480, it is determined whether a predetermined number of stages has been trained. The predetermined number may be based on a desired accuracy, an undersampling factor of expected input imaging data, a maximum reconstruction time, and on any other factors.

Flow returns to S460 if the desired number of stages has not yet been trained. At S460, and for each training example, another output image is generated by inputting the modified imaging data, the modified acquisition parameters, and the prior input image of the training example to the previously-trained stage. Continuing the present description, the "prior input image" is the image of a training example which was input to the second network stage during training. A next network stage is trained at S470 based on the target image, modified imaging data, modified acquisition parameters, and newly-generated output image of each training example. With respect to the notation provided above, a set of training examples for training a network stage n at S470 consists of $\{\rho_t^m, \rho_n^m, d^m, \theta^m\}$, where $\rho_n^m$ is the output image from the trained $(n-1)^{th}$ stage. For n=0, $\rho_0^m$ is an initial image generated based on $\{d^m, \theta^m\}$ as described above.

Flow therefore cycles between S460, S470 and S480 until the desired number of stages has been trained, at which point process 400 terminates.

Figure 8:
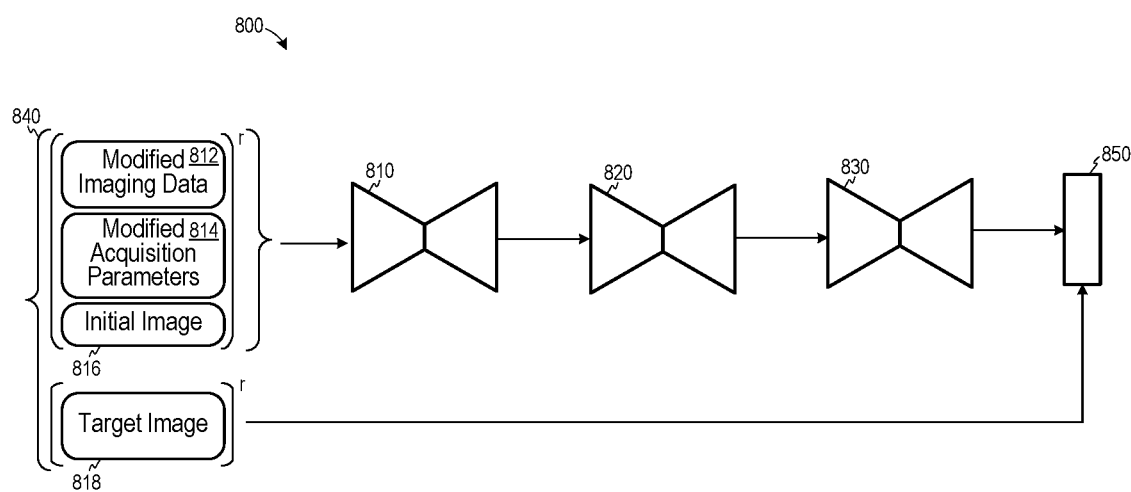
FIG. 8 is a block diagram illustrating testing a trained multi-stage network according to some embodiments.

According to some embodiments, performance of the trained network stages is evaluated based on testing examples after execution of process 400. FIG. 8 shows testing architecture 800 for testing a multi-stage network for MR reconstruction composed of three network stages 810, 820 and 830 trained as described above. Also shown are r testing examples 840, each of which is composed of input data 812, 814 and 816 and ground truth data 818. Each example 840 may be generated as described above with respect to the training examples. Loss layer 850 computes a total loss, using any suitable loss function, to evaluate the performance of the multi-stage network as is known in the art.

Several remedial options are available if the performance of the multi-stage network is determined to be unsatisfactory (based on any desired metrics). In one example, additional training may be performed to optimize the network parameters and step sizes of each network stage by minimizing the average of a loss metric over a set of training examples, i.e.

$$\Omega = \operatorname*{argmin}_{\Omega} \frac{1}{M} \sum_{m=1}^{M} L(\rho_t^m - F_\Omega(\rho_0^m, d^m, \theta^m), d^m, \theta^m),$$

where $\Omega$ represents the parameters of all network stages and $F_\Omega(\rho_0^m, d^m, \theta^m)$ is the image output by the last network stage. The loss function $L(\bullet)$ may comprise any suitable loss function, including a function different from any loss function used to train any of the individual network stages as described above.

In a variant of the above example, the parameters of one or more of the network stages may be held static while performing the above optimization on the parameters of the other network stages. In another example, one or more of the network stages may be retrained, using a different loss function, a different optimization algorithm, and/or a different target loss. In yet another example, additional network stages may be trained and added to the multi-stage network as described with respect to process 400.

Figure 9:
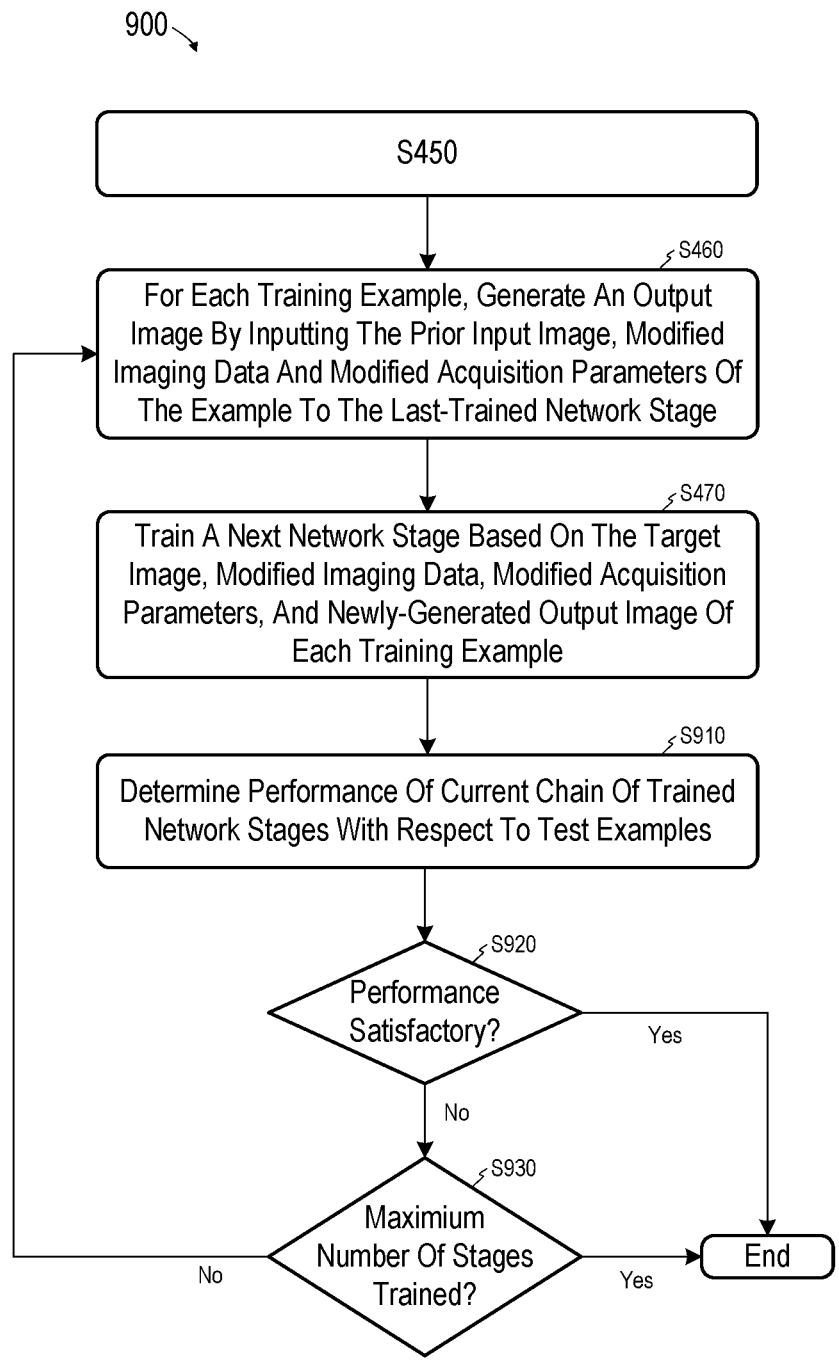
FIG. 9 is a flow diagram of process steps to limit a number of network stages based on overall network performance according to some embodiments.

FIG. 9 illustrates process 900 according to some embodiments. Process 900 is a variant of process 400 in which additional network stages are added to the multi-stage network and trained based on intermediate performance testing.

According to process 900, S410 through S470 are executed as described above. Then, after the first iteration of S470 (at which point the first network stage n=0 has been trained), the performance of the currently-trained chain of network stages is determined at S910. The performance may be determined based on any metrics and as described with respect to FIG. 8. However, at a first execution of S910, network stages 820 and 830 will not be included in the performance determination. That is, loss layer 850 will determine the performance based on the output of trained network stage 810.

The determined performance is compared against suitable metrics at S920. If the performance of the currently-trained chain of network stages is determined to be satisfactory, flow terminates and the currently-trained stage(s) comprise the MR reconstruction network. If not, flow proceeds to S930 to determine whether a maximum number of stages has been trained. In this regard, it may be beneficial to set a maximum number of network stages to limit training time.

Flow returns to S460 to train another network stage if it is determined at S930 that the maximum number of stages has not been trained. Flow proceeds through S460 and S470 and to add another trained network stage to the network. The performance of the current chain of trained network stages is determined at S910. With reference to FIG. 8, S910 now comprises determination of the overall performance of network stages 810 and 820 based on the output of trained network stage 820.

The determined performance is evaluated at S920. The evaluation at S920 may differ depending on the number of trained network stages. For example, the performance criteria for a multi-stage network having a low number of network stages may be lower than for a multi-stage network having a high number of network stages, due to performance advantages of a smaller network.

Flow terminates once the performance is deemed satisfactory at S920 or it is determined at S930 that the maximum number of stages has been trained. It may be determined at S930 that a maximum number of stages has been trained if the performance of the network has not improved sufficiently in response to the addition of the last X (e.g., X=2)

network stages. Overall network performance may then be evaluated as described above.

Figure 10:
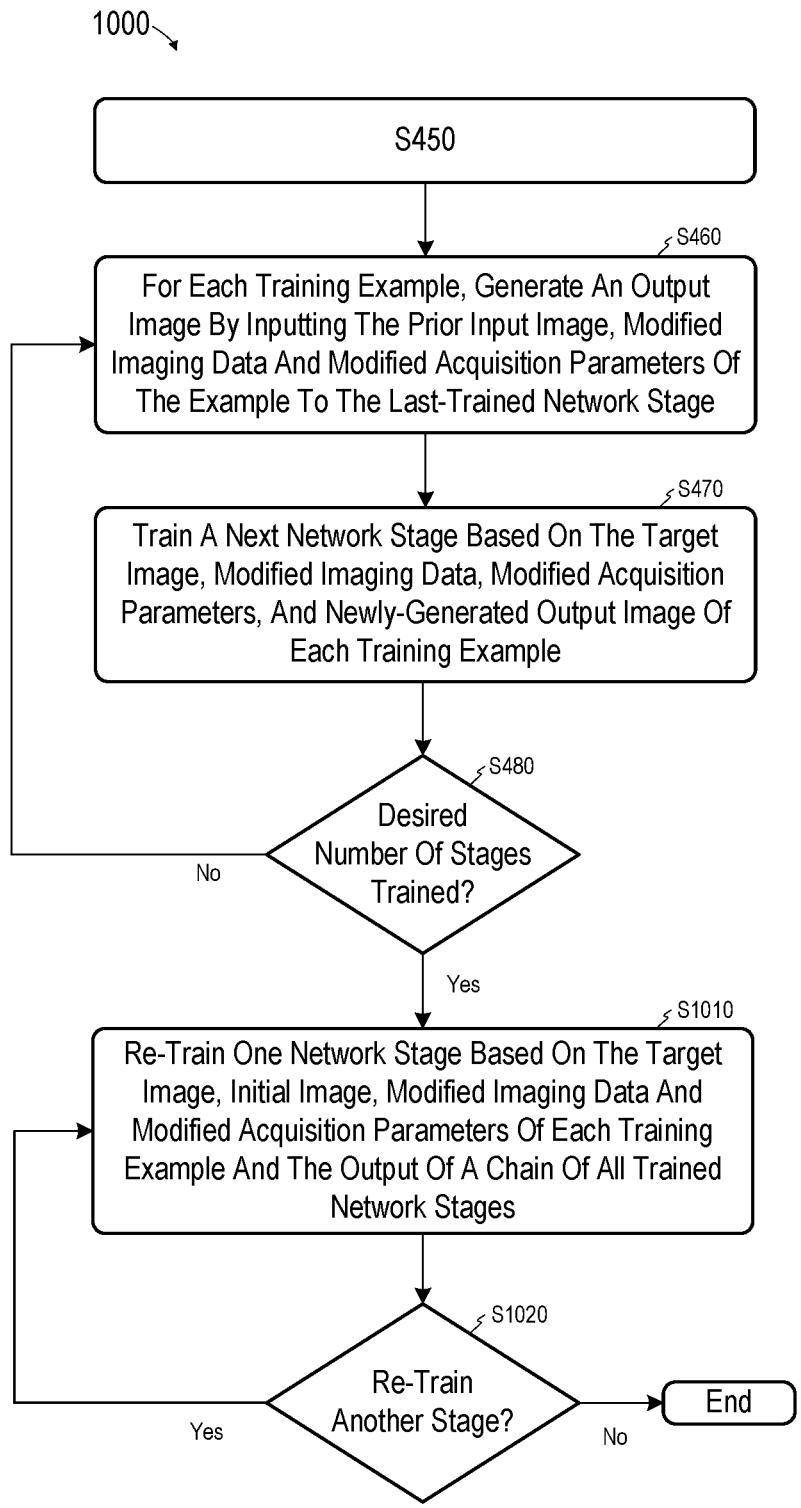
FIG. 10 is a flow diagram of process steps to independently re-train trained network stages based on a final network output according to some embodiments.

FIG. 10 illustrates process 1000, which is also a variant of process 400. According to process 1000, network stages undergo additional "refinement" training once all network stages have been trained.

S410 through S480 are executed as described above. Once it is determined at S480 that the desired number of stages have been trained, one of the network stages is re-trained at S1010 based on the target image, initial image, modified imaging data and modified acquisition parameters of each training example and the output of a chain of all the trained network stages. Assuming that three network stages have been trained, S1010 may be implemented as shown in FIG. 8. However, during training, the parameters $\omega_n$ of all network stages but one are fixed while the parameters of the one network stage are optimized based on the final output of the overall network, i.e., $$\omega_n = \arg\min_\omega \frac{1}{M} \sum_{m=1}^{M} L_{N-1}(\rho_T^m, U_{\omega_{N-1}}^{N-1}( \cdots U_{\omega_{n+1}}^{n+1}(U_{\omega_n}^n(\rho_n^m, d^m, \theta^m), d^m, \theta^m) \cdots , d^m, \theta^m), d^m, \theta^m).$$

Although the loss is computed by passing the output of the $n^{th}$ stage through all of the following stages, the size of the optimization problem is the same as in the initial training phases because only the parameters of the $n^{th}$ stage are being optimized. The loss function may differ from any loss function used to train any of the individual network stages. Moreover, the optimization algorithm may differ from the algorithm used to originally train the parameters of the one network stage.

In some embodiments, S1010 is performed using the same training examples (e.g., training examples 640) which were used to train the first network stage. Such training benefits from the prior generation of the output images of each network stage for each training example during training of the network stages. Accordingly, refinement training of a downstream network stage n only requires input of the already-generated (and stored) output images of the $(n-1)^{th}$ network stage, rather than requiring execution of any upstream network stages to generate output images.

In some embodiments, S1010 may include re-training parameters of any combination of more than one network stage while the parameters of the other network stages remain fixed.

At S1020 it is determined whether another stage should be re-trained. In one example, all network stages are to be separately re-trained and S1020 therefore comprises determination if any of the network stages have not yet been re-trained. If so, flow returns to S1010 to re-train one of the network stages which has not yet been re-trained. Flow terminates if it is determined at S1020 that all network stages which are to be re-trained have been re-trained. Performance of the overall network may then be evaluated as described above.

Figure 11:
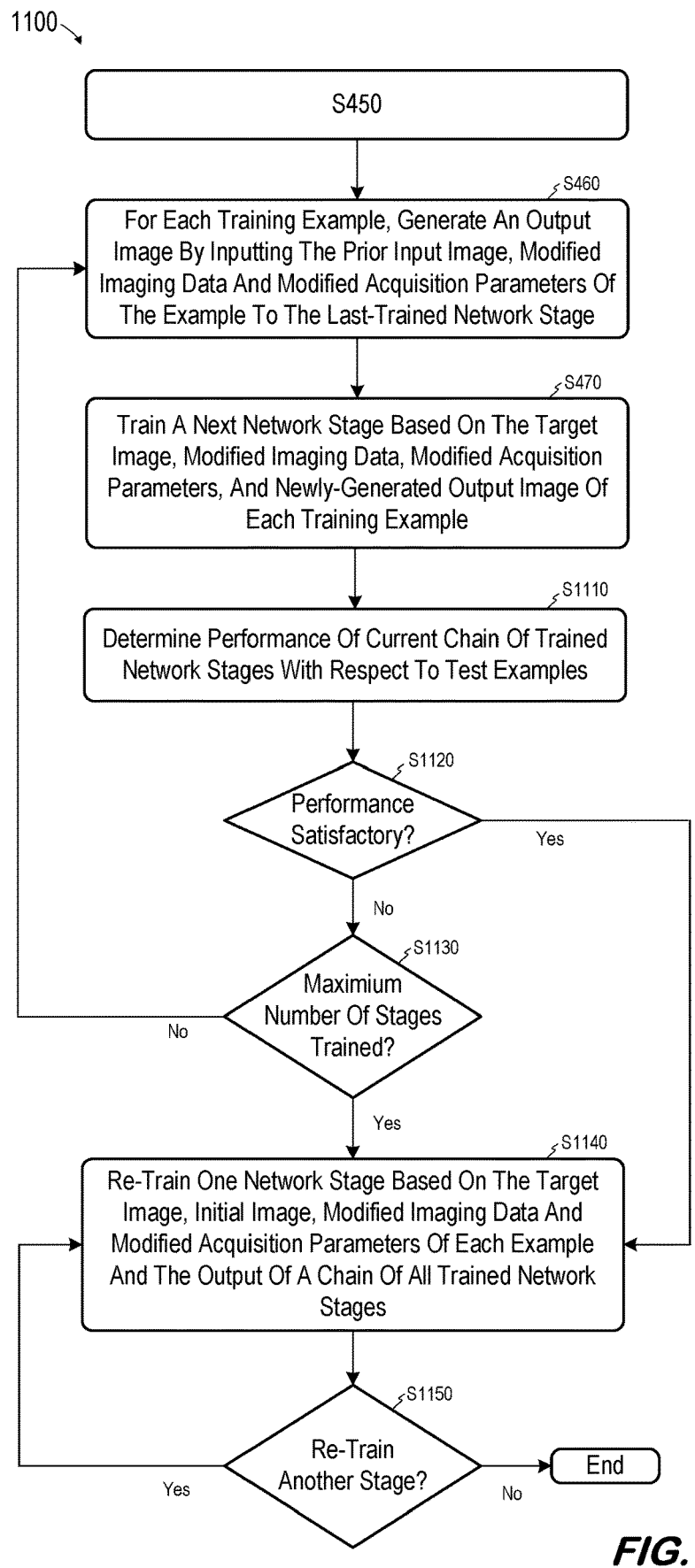
FIG. 11 is a flow diagram of process steps to limit a number of network stages based on overall network performance and to independently re-train trained network stages based on a final network output according to some embodiments.

FIG. 11 illustrates process 1100 according to some embodiments. Process 1100 includes steps to add network stages based on intermediate performance testing and to subject network stages to refinement training once all network stages have been individually trained.

After performing S410 through S470, the performance of the currently-trained chain of network stages (i.e., consisting of one network stage) is determined at S1110 as described above with respect to S910. The determined performance is compared against applicable metrics at S1120 to determine if the performance is satisfactory. If the performance is not satisfactory, flow proceeds to S1130 to determine whether a maximum number of stages has been trained.

Flow returns to S460 to train another network stage if it is determined at S1130 that the maximum number of stages has not been trained. Flow again proceeds through S460, S470 and S1110 as described above to add another trained network stage to the network. S1120 is again performed to determine the overall performance of the two trained network stages based on the output of the last trained network stage.

Flow continues in this manner and proceeds to S1140 once the performance is deemed satisfactory at S1120 or it is determined at S1130 that the maximum number of stages has been trained. At S1140, one of the network stages is re-trained as described with respect to S1010 based on the target image, initial image, modified imaging data and modified acquisition parameters of each training example and the output of the complete chain of trained network stages.

It is determined at S1150 whether to re-train another network, as described above with respect to S1020. If so, flow returns to S1140 to re-train one of the network stages which has not yet been re-trained. Process 1100 terminates if it is determined at S1150 that all network stages which are to be re-trained have been re-trained. Performance of the overall network may then be evaluated as described above.

According to some embodiments, after it is determined at S1150 that all network stages which are to be re-trained have been re-trained, the loop consisting of S1140 and S1150 is repeated to re-train these network stages again. This may continue until each of the network stages is re-trained a particular number of times, or until the network performance (as determined by a metric on the output of the last network stage) is satisfactory.

Figure 12:
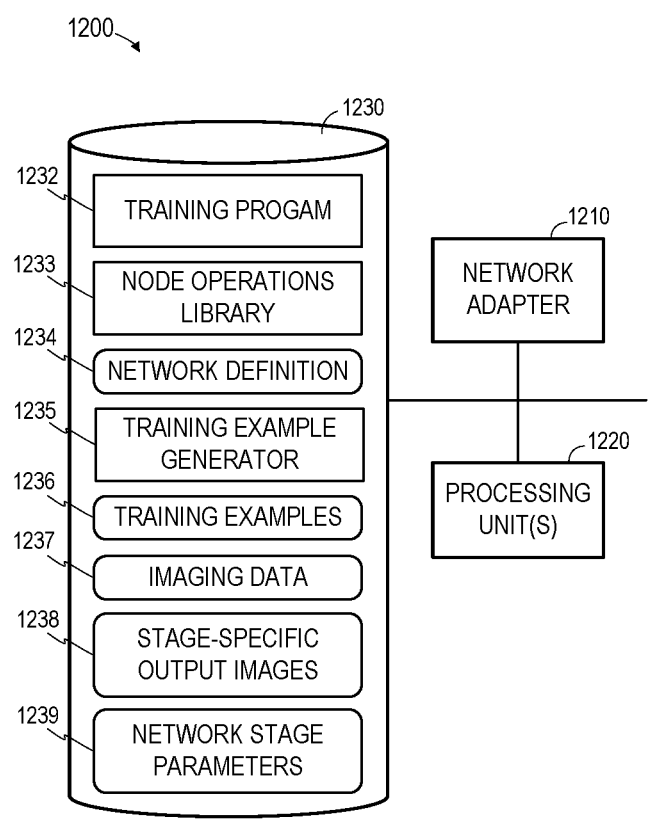
FIG. 12 is a block diagram of an apparatus to execute network training according to some embodiments.

FIG. 12 illustrates computing system 1200 according to some embodiments. System 1200 may comprise a computing system to facilitate the design and training of a multi-stage network as is known in the art. Computing system 1200 may comprise a standalone system, or one or more elements of computing system 1200 may be located in the cloud.

System 1200 includes network adapter 1210 to communicate with external devices via a network connection. Processing unit(s) 1220 may comprise one or more processors, processor cores, or other processing units to execute processor-executable program code. In this regard, storage system 1230, which may comprise one or more memory devices (e.g., a hard disk drive, a solid-state drive), stores processor-executable program code of training program 1232 which may be executed by processing unit(s) 1220 to train a network as described herein.

Training program 1232 may utilize node operations library 1233, which includes program code to execute various operations associated with node operations as defined in node operations library 1233. According to some embodiments, computing system 1200 provides interfaces and development software (not shown) to enable development of training program 1232 and generation of network definitions 1234 which describe the architecture of network stages of a multi-stage network for MR reconstruction.

Storage device 1230 also includes program code of training example generator 1235 which may operate to generate target images, initial images, modified imaging data and modified acquisition parameters of training examples 1236 based on imaging data 1237. Stage-specific output images 1238 may comprise $\rho_n^m$ (n>0) as described above, thereby eliminating a need to operate upstream stages during training of a downstream network stage. Network stage parameters 1239 may comprise trained, partially-trained or untrained parameters $\omega_n$ of the network stages of a multi-stage network.

Some embodiments significantly reduce the amount of training examples needed to train a given number of network stages in comparison to conventional systems, since the number of parameters of each optimization problem addressed during training of the network stages is reduced by a factor of N (i.e., the number of network stages). This reduction may significantly reduce costs associated with acquiring training examples.

The amount of computation time needed to perform training in some embodiments will scale approximately linearly with the number of network stages if the number of parameters per network stage is held substantially constant. Because the amount of time needed to jointly learn the parameters of all stages, as in standard methods, often scales superlinearly with the number of stages, the linear scaling provided by some embodiments may provide significant savings of computational resources.

For a fixed number of training examples, some embodiments will be less prone to over-fitting since the number of parameters in each parameter optimization problem is reduced by a factor of N. This characteristic may improve the ability of the trained network to maintain reconstruction quality over a larger number of contrasts and imaging scenarios than conventional systems.

Some embodiments as described above allow for the addition of network stages as needed and without re-training of existing network stages to achieve desired reconstruction accuracy since the addition of a network stage only requires the reconstructed images generated by the immediately-upstream stage. This feature may significantly reduce the computational costs of training compared to standard systems, which would require a complete retraining of all parameters of all network stages. Additionally, the computational cost required to determine the number of network stages needed to achieve a given reconstruction quality may be reduced as a result of the approximately linear relationship between computational time and the number of network stages.

If it is desired to jointly train the parameters of all network stages for improved accuracy or to train parameters of one or more network stages using state-of-the-art loss functions, such as adversarial loss, which can be unstable with respect to the initial input image, the parameters of the network stages may be first initialized via individual network stage training as described herein. This option may significantly reduce the total time needed for training and thereby provide a desirable trade-off between computational-resources, reconstruction accuracy, and network evaluation time (which is proportional to the number of stages).

As detailed above, some embodiments allow the loss function to vary with network stage, thereby providing greater training flexibility. Moreover, embodiments facilitate network performance analysis by suppressing intra-stage coupling.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a storage device storing a plurality of target examples, each of the plurality of target examples including respective target imaging data and target acquisition parameters; and
   a processing unit to execute processor-executable program code to cause the system to:
   generate, for each target example, modified imaging data and modified acquisition parameters of a training example based on the target imaging data and target acquisition parameters of the target example;
   generate, for each training example, an initial reconstructed image based on the modified imaging data and modified acquisition parameters of the training example;
   train a first network stage of a multi-stage network based on the modified imaging data, modified acquisition parameters and initial reconstructed image of each training example;
   generate a first output image for each training example by inputting the modified imaging data, modified acquisition parameters and initial reconstructed image of the training example to the trained first network stage; and
   train a second network stage of the multi-stage network based on the modified imaging data, modified acquisition parameters and first output image of each training example.

2. A system according to claim 1, the processing unit to execute processor-executable program code to cause the system to:
   determine whether to train a third stage of the multi-stage network; and
   if it is determined to train a third stage of the multi-stage network,
   generate a second output image for each training example by inputting the modified imaging data, modified acquisition parameters and first output image of the training example to the trained second network stage; and
   train a third network stage of the multi-stage network based on the modified imaging data, modified acquisition parameters and second output image of each training example.

3. A system according to claim 2, wherein determination of whether to train a third stage of the multi-stage network comprises evaluation of a performance of the multi-stage network comprising the trained first network stage and the trained second network stage.

4. A system according to claim 3, the processing unit to execute processor-executable program code to cause the system to:
   input the modified imaging data, modified acquisition parameters and initial reconstructed image of each training example to the trained first network stage and operate the trained first network stage and the trained second network stage of the multi-stage network to generate network output images based on the input;
   re-train the first network stage based on the network output images while the parameters of the second network stage remain fixed;
   input the modified imaging data, modified acquisition parameters and initial reconstructed image of each training example to the re-trained first network stage and operate the re-trained first network stage and the trained second network stage of the multi-stage network to generate second network output images based on the input to the re-trained first network stage; and train the second network stage based on the second network output images while the parameters of the first network stage remain fixed.

5. A system according to claim 3, wherein the first network stage is trained based on a first loss function, and wherein the second network stage is trained based on a second loss function.

6. A system according to claim 1, the processing unit to execute processor-executable program code to cause the system to:

input the modified imaging data, modified acquisition parameters and initial reconstructed image of each training example to the trained first network stage and operate the trained first network stage and the trained second network stage of the multi-stage network to generate network output images based on the input;

re-train the first network stage based on the network output images while the parameters of the second network stage remain fixed;

input the modified imaging data, modified acquisition parameters and initial reconstructed image of each training example to the re-trained first network stage and operate the re-trained first network stage and the trained second network stage of the multi-stage network to generate second network output images based on the input to the re-trained first network stage; and train the second network stage based on the second network output images while the parameters of the first network stage remain fixed.

7. A system according to claim 6, wherein the second network stage is trained based on a first loss function, and wherein the second network stage is re-trained based on a second loss function.

8. A method comprising:

generating, for each target example, modified imaging data and modified acquisition parameters of a training example based on the target imaging data and target acquisition parameters of the target example;

generating, for each training example, an initial reconstructed image based on the modified imaging data and modified acquisition parameters of the training example;

training a first network stage of a multi-stage network based on the modified imaging data, modified acquisition parameters and initial reconstructed image of each training example, and on a target image generated based on the target imaging data and target acquisition parameters of each target example;

generating a first output image for each training example by inputting the modified imaging data, modified acquisition parameters and initial reconstructed image of the training example to the trained first network stage; and train a second network stage of the multi-stage network based on the modified imaging data, modified acquisition parameters and first output image of each training example, and on the target image generated based on the target imaging data and target acquisition parameters of each target example.

9. A method according to claim 8, further comprising:

determining whether to train a third stage of the multi-stage network; and if it is determined to train a third stage of the multi-stage network, generating a second output image for each training example by inputting the modified imaging data, modified acquisition parameters and first output image of the training example to the trained second network stage; and training a third network stage of the multi-stage network based on the modified imaging data, modified acquisition parameters and second output image of each training example, and on the target image generated based on the target imaging data and target acquisition parameters of each target example.

10. A method according to claim 9, wherein determining whether to train a third stage of the multi-stage network comprises evaluating performance of the multi-stage network comprising the trained first network stage and the trained second network stage.

11. A method according to claim 10, further comprising:

inputting the modified imaging data, modified acquisition parameters and initial reconstructed image of each training example to the trained first network stage and operating the trained first network stage and the trained second network stage of the multi-stage network to generate network output images based on the input;

re-training the first network stage based on the network output images while the parameters of the second network stage remain fixed;

inputting the modified imaging data, modified acquisition parameters and initial reconstructed image of each training example to the re-trained first network stage and operating the re-trained first network stage and the trained second network stage of the multi-stage network to generate second network output images based on the input to the re-trained first network stage; and training the second network stage based on the second network output images while the parameters of the first network stage remain fixed.

12. A method according to claim 10, wherein the first network stage is trained based on a first loss function, and wherein the second network stage is trained based on a second loss function.

13. A method according to claim 8, further comprising:

inputting the modified imaging data, modified acquisition parameters and initial reconstructed image of each training example to the trained first network stage and operating the trained first network stage and the trained second network stage of the multi-stage network to generate network output images based on the input;

re-training the first network stage based on the network output images while the parameters of the second network stage remain fixed;

inputting the modified imaging data, modified acquisition parameters and initial reconstructed image of each training example to the re-trained first network stage and operate the re-trained first network stage and the trained second network stage of the multi-stage network to generate second network output images based on the input to the re-trained first network stage; and training the second network stage based on the second network output images while the parameters of the first network stage remain fixed.

14. A method according to claim 13, wherein the second network stage is trained based on a first loss function, and wherein the second network stage is re-trained based on a second loss function.

15. A system comprising:
a training example generator to:
generate modified imaging data and modified acquisition parameters of training examples based on target imaging data and target acquisition parameters of each of a plurality of target examples; and
generate an initial reconstructed image based on the modified imaging data and modified acquisition parameters of each training example;
a training system to:
train a first network stage of a multi-stage network based on the modified imaging data, modified acquisition parameters and initial reconstructed image of each training example, and on a target image associated with a corresponding target example;
generate a first output image for each training example by inputting the modified imaging data, modified acquisition parameters and initial reconstructed image of the training example to the trained first network stage; and
train a second network stage of the multi-stage network based on the modified imaging data, modified acquisition parameters and first output image of each training example, and on a target image associated with a corresponding target example.

16. A system according to claim 15, the training system to:
determine whether to train a third stage of the multi-stage network; and
if it is determined to train a third stage of the multi-stage network,
- generate a second output image for each training example by inputting the modified imaging data, modified acquisition parameters and first output image of the training example to the trained second network stage; and
- train a third network stage of the multi-stage network based on the modified imaging data, modified acquisition parameters and second output image of each training example, and on a target image associated with a corresponding target example.

17. A system according to claim 16, wherein determination of whether to train a third stage of the multi-stage network comprises evaluation of a performance of the multi-stage network comprising the trained first network stage and the trained second network stage.

18. A system according to claim 17, the training system to:
input the modified imaging data, modified acquisition parameters and initial reconstructed image of each training example to the trained first network stage and operate the trained first network stage and the trained second network stage of the multi-stage network to generate network output images based on the input;
re-train the first network stage based on the network output images while the parameters of the second network stage remain fixed;
input the modified imaging data, modified acquisition parameters and initial reconstructed image of each training example to the re-trained first network stage and operate the re-trained first network stage and the trained second network stage of the multi-stage network to generate second network output images based on the input to the re-trained first network stage; and
train the second network stage based on the second network output images while the parameters of the first network stage remain fixed.

19. A system according to claim 17, wherein the first network stage is trained based on a first loss function, and wherein the second network stage is trained based on a second loss function.

20. A system according to claim 15, the training system to:
input the modified imaging data, modified acquisition parameters and initial reconstructed image of each training example to the trained first network stage and operate the trained first network stage and the trained second network stage of the multi-stage network to generate network output images based on the input;
re-train the first network stage based on the network output images while the parameters of the second network stage remain fixed;
input the modified imaging data, modified acquisition parameters and initial reconstructed image of each training example to the re-trained first network stage and operate the re-trained first network stage and the trained second network stage of the multi-stage network to generate second network output images based on the input to the re-trained first network stage; and
train the second network stage based on the second network output images while the parameters of the first network stage remain fixed,
wherein the second network stage is trained based on a first loss function, and wherein the second network stage is re-trained based on a second loss function.

* * * * *